Patented May 28, 1935

2,002,601

UNITED STATES PATENT OFFICE 2,002,601

SYNTHETIC RESINS AND PROCESS OF MAKING SAME

Alphonse Gams and Karl Frey, Basel, Switzerland, assignors, by mesne assignments, to the firm of Ciba Products Corporation, Dover, Del.

No Drawing. Application October 16, 1929, Serial No. 400,153. In Switzerland November 6, 1928

6 Claims. (Cl. 260—130)

This invention relates to synthetic resins from primary aromatic amines and aldehydes. It comprises the process for the manufacture of these resins, the new products themselves, as well as the application of same in the synthetic resin industry.

The copending specification Serial No. 245,039 relates to a process of manufacturing infusible molded synthetic resins which consists in subjecting an infusible but thermoplastic condensation product, obtained by condensing a primary aromatic amine with an excess of formaldehyde in the presence of an acid and subsequently eliminating the action of the acid, to molding under pressure and preferably at elevated temperature.

In carrying out this manufacture it was found that for obtaining complicated molded bodies it is advantageous to have present a fluxing agent in the powder which is to be compressed, in order to facilitate the molding.

According to the present invention, fusible aldehyde condensation products are used as such fluxing agents; for example, the fusible amine aldehyde condensation products, for instance anhydroformaldehydeaniline, or the fusible resins obtained by condensing a primary aromatic amine with an equimolecular proportion of formaldehyde in presence of an acid and in presence or absence of a filling material, and subsequently eliminating the action of the acid (cf. the copending specifications Serial No. 398,267 and Serial No. 398,268); also the fusible phenol aldehyde condensation products.

The fluxing agent may be added to the powder which is ready to be compressed, or it can be produced from the components during the pressing operation. The mixtures of powders prepared according to specification Serial No. 245,039 and the above mentioned fluxing agents have such a satisfactory degree of fluidity that they can be molded at temperatures essentially lower and in a considerably shorter time than is necessary for molding the powders which have not been mixed with the fluxing agents.

The degree of diminution of the temperature and time used for molding depends on the proportion and nature of the fluxing agent used.

The following examples illustrate the invention, the parts being by weight:—

Example 1

100 parts of a molding powder made by condensing 1 molecular proportion of aniline with 1.6 molecular proportion of formaldehyde in presence of 1 molecular proportion of hydrochloric acid and subsequently eliminating the action of the acid, which molding powder requires in the molding a temperature of about 230° C. are mixed with 10 parts of anhydroformaldehydeaniline. The mixture may be compressed at 150° C. to completely homogeneous infusible molded pieces.

Example 2

100 parts of the powder capable of being molded at about 150° C. and made by condensing 1 molecular proportion of aniline with 1.2 molecular proportion of formaldehyde in presence of 1 molecular proportion of hydrochloric acid, and subsequently eliminating the action of the acid, are mixed with 8 parts of a fusible resin made from 1 molecular proportion of aniline and 1 molecular proportion of formaldehyde, in presence of one molecular proportion of hydrochloric acid, and subsequently eliminating the action of the acid. When compressed at 120-130° C. the mixture yields homogeneous infusible molded pieces.

Example 3

100 parts of the powder which requires a temperature of about 230° C. for molding and made as described in Example 1 are mixed with 5 parts of phenol. The mixture can be compressed at 150° C. to form homogeneous infusible molded pieces. If in this example aniline is substituted for phenol, like products are obtained.

Small proportions of a fluxing agent may advantageously be mixed homogeneously with the powder to be compressed by dissolving the agent in a solvent such as alcohol, acetone or benzene, and saturating the powder to be compressed with this solution and subsequently separating the solvent, if necessary by evaporation in a vacuum.

The expression "formaldehyde-yielding compounds" is employed herein because it has been found that instead of formaldehyde itself, also its polymers or any other substance splitting off or yielding formaldehyde under the conditions of the condensation described herein, may be used in carrying out the invention.

What we claim is:—

1. A process for manufacturing molded infusible synthetic resins from an infusible but thermoplastic material obtained by condensing one mol of a primary aromatic amine with a formaldehyde compound yielding more than one mol of formaldehyde compound in presence of an acid and subsequently eliminating the action of the acid, characterized by effecting the molding in presence of a minor portion of a fusible aldehyde condensation product.

2. A process of manufacturing molded infusible synthetic resins from an infusible but thermoplastic material obtained by condensing one mol of aniline with more than one mol of formaldehyde in presence of an acid and subsequently eliminating the action of the acid, characterized by effecting the molding in presence of a minor portion of a fusible aldehyde condensation product.

3. A molding composition comprising a mixture of an infusible but thermosplastic condensation product of a primary aromatic amine and a formaldehyde yielding compound with a minor portion of a fusible aldehyde condensation product.

4. A molding composition comprising a mixture of an infusible but thermoplastic condensation product of aniline and a formaldehyde yielding compound with a minor portion of a fusible aldehyde condensation product.

5. A molded synthetic resin obtained by molding under pressure and heat a mixture of an infusible but thermoplastic condensation product of a primary aromatic amine and a formaldehyde yielding compound with a minor portion of a fusible aldehyde condensation product.

6. A molded synthetic resin obtained by molding under pressure and heat a mixture of an infusible but thermoplastic condensation product of aniline and a formaldehyde yielding compound with a minor portion of a fusible aldehyde condensation product.

ALPHONSE GAMS.
KARL FREY.